United States Patent
Matsuzaki et al.

(10) Patent No.: US 8,985,087 B2
(45) Date of Patent: Mar. 24, 2015

(54) AIR INTAKE SYSTEM FOR INTERNAL COMBUSTION ENGINE

(71) Applicant: Mahle Filter Systems Japan Corporation, Tokyo (JP)

(72) Inventors: Junichi Matsuzaki, Shiki (JP); Takashi Kawano, Kawagoe (JP)

(73) Assignee: Mahle Filter Systems Japan Corporation, Tokyo (JP)

( * ) Notice: Subject to any disclaimer, the term of this patent is extended or adjusted under 35 U.S.C. 154(b) by 0 days.

(21) Appl. No.: 14/192,360

(22) Filed: Feb. 27, 2014

(65) Prior Publication Data

US 2014/0238330 A1 Aug. 28, 2014

(30) Foreign Application Priority Data

Feb. 28, 2013 (JP) ................................. 2013-038069
May 21, 2013 (JP) ................................. 2013-106693

(51) Int. Cl.
| | |
|---|---|
| *F02B 31/00* | (2006.01) |
| *F02M 35/10* | (2006.01) |
| *F02B 31/06* | (2006.01) |
| *F02D 9/16* | (2006.01) |
| *F16K 1/20* | (2006.01) |
| *F16K 25/00* | (2006.01) |
| *F02D 9/10* | (2006.01) |
| *F02D 41/00* | (2006.01) |

(52) U.S. Cl.
CPC .......... *F02M 35/10118* (2013.01); *F02B 31/06* (2013.01); *F02D 9/16* (2013.01); *F16K 1/20* (2013.01); *F16K 25/00* (2013.01); *F02D 9/1015* (2013.01); *F02D 9/1025* (2013.01); *F02B 2275/48* (2013.01); *F02D 2041/0015* (2013.01)

USPC ........................ 123/306; 123/184.56; 123/336

(58) Field of Classification Search
USPC ............ 123/184.55, 184.56, 190.1, 306, 336, 123/337
See application file for complete search history.

(56) References Cited

U.S. PATENT DOCUMENTS

| | | |
|---|---|---|
| 6,138,628 A | 10/2000 | Alex et al. |
| 2010/0122680 A1 | 5/2010 | Sano |
| 2010/0251987 A1 | 10/2010 | Sano |

FOREIGN PATENT DOCUMENTS

| | | |
|---|---|---|
| JP | 2007-239629 A | 9/2007 |
| JP | 2007-239703 A | 9/2007 |
| JP | 2010-121551 A | 6/2010 |
| JP | 2010-242618 A | 10/2010 |

*Primary Examiner* — Noah Kamen
(74) *Attorney, Agent, or Firm* — Foley & Lardner LLP

(57) ABSTRACT

An air intake system for an internal combustion engine has a valve body that can open/close a passage cross section of a part of an air intake passage; a rotation shaft that extends to both sides of the valve body and supports rotation of the valve body; a valve accommodating recess that is formed on an inner wall surface of the air intake passage and accommodates therein the valve body; and a protruding line that is formed on an outer peripheral side surface of the valve body, which faces the valve accommodating recess, and extends along a shaft direction of the rotation shaft. The air intake system further has a communication passage that directly connects the valve accommodating recess and an intake port of the internal combustion engine.

8 Claims, 12 Drawing Sheets

US 8,985,087 B2

AIR INTAKE SYSTEM FOR INTERNAL COMBUSTION ENGINE

BACKGROUND OF THE INVENTION

The present invention relates to an air intake system for an internal combustion engine, which is provided at an upstream side of an intake port and generates gas flow (or gas stream) such as tumble flow in a combustion chamber of the internal combustion engine using a valve body by changing a cross section area of a part of an air intake passage.

For instance, Japanese Patent Provisional Publications No. 2010-121551 (hereinafter is referred to as "JP2010-121551") and No. 2010-242618 (hereinafter is referred to as "JP2010-242618") each disclose an air intake system for the internal combustion engine, which is capable of changing an opening area of the air intake passage by a valve body whose rotation angle is changed from a fully open position in which a quantity of suction air flowing in the air intake passage becomes a maximum to a fully closed position in which the quantity of the suction air flowing in the air intake passage becomes a minimum.

This air intake system is configured so that the valve body, which has a valve portion that is offset in a radially outward direction with respect to a rotation axis of a supporting shaft of the valve body, is rotatably supported in the air intake passage that is formed inside a housing. Then, by rotation of the valve body, the cross section area of a part of the air intake passage can be changed.

In JP2010-121551 and JP2010-242618, to employ this configuration, a valve accommodating recess (a valve accommodating space) is formed on an inner wall surface at a vertically lower side in the air intake passage. More specifically, the valve accommodating space is formed so that when the valve body rotates and is positioned in the fully open position, the valve body can be fully accommodated in the valve accommodating space.

SUMMARY OF THE INVENTION

In JP2010-121551 and JP2010-242618, however, since the valve accommodating space to accommodate the valve body is formed on the vertically lower side inner wall in the air intake passage, deposits that are generated due to spitting from the combustion chamber or EGR (Exhaust Gas Recirculation) deposit or accumulate in the valve accommodating space. This deposition causes fixation or sticking of the valve body, which might lead to a malfunction of the air intake system.

It is therefore an object of the present invention to provide an air intake system for the internal combustion engine, which is capable of suppressing the deposition (accumulation) of the deposits depositing in the valve accommodating space, even though the recessed valve accommodating space are formed at the vertically lower side in the air intake passage.

According to one aspect of the present invention, an air intake system for an internal combustion engine comprises: a valve body that can open/close a passage cross section of a part of an air intake passage; a rotation shaft that extends to both sides of the valve body and supports rotation of the valve body, the valve body being configured to be offset with respect to a rotation axis of the rotation shaft; a valve accommodating recess that is formed on an inner wall surface of the air intake passage and accommodates therein the valve body; and a protruding line that is formed on an outer peripheral side surface of the valve body, which faces the valve accommodating recess, and extends along a shaft direction of the rotation shaft.

With this configuration, by opening and closing the valve body, it is possible to expel (sweep away) the deposits accumulated in the valve accommodating recess from the valve accommodating recess by the protruding line.

In the air intake system, the protruding line could be formed at one end side along a rotation direction of the valve body.

In the air intake system, the protruding lines might be formed at one end side and the other end side along a rotation direction of the valve body.

In the air intake system, the protruding line is set so that, when viewed from the shaft direction of the rotation shaft, a rotation locus of a top end of the protruding line is positioned in an outermost position of a rotation locus of the valve body.

According to another aspect of the present invention, an air intake system for an internal combustion engine comprises: a housing that forms therein an air intake passage connecting to an intake port of the internal combustion engine; a valve body that is rotatably supported in the housing through a rotation shaft and has a valve portion provided so as to be offset in a radially outward direction with respect to a rotation axis of the rotation shaft, the valve body changing a passage cross section area of a part of the air intake passage by the valve portion; a valve accommodating recess that is formed on an inner wall surface at a vertically lower side in the air intake passage and accommodates therein the valve portion at valve opening; and a communication passage that is formed in the housing and directly connects the valve accommodating recess and the intake port.

With this configuration, even in a case where the deposits are generated (accumulated) in the valve accommodating recess, by a suction force by a negative pressure of the internal combustion engine from the intake port, the deposits in the valve accommodating recess is sucked into the intake port through the communication passage, then the deposits can be removed from the valve accommodating recess.

In the air intake system, a part of the communication passage could be formed by a penetration hole which penetrates an inside of the housing and whose one end opens at an inner surface of the valve accommodating recess.

With this structure, a passage cross section area of the communication passage can be reduced to a minimum. Thus, at a valve closing control which requires production of even stronger tumble flow, it is possible to keep a decrease in a generation efficiency of swirl flow or tumble flow to a minimum.

In the air intake system, the communication passage might be formed by a cutting groove which is formed along the air intake passage by recessing the inner wall surface of the air intake passage and whose one end opens at an inner surface of the valve accommodating recess and whose other end opens in the intake port.

With this structure, the communication passage can be easily formed (molded). As a consequence, good quality of the air intake system can be maintained, and productivity of the air intake system can be increased.

Here, regarding the structure of the communication passage using the penetration hole, the communication passage could connect the valve accommodating recess and the air intake passage at a downstream side with respect to the valve accommodating recess through the penetration hole.

With this structure as well, as same as the case where the valve accommodating recess and the intake port are directly connected through the communication passage, by a suction force by a negative pressure of the internal combustion engine from the intake port, the deposits in the valve accommodating recess is sucked into the intake port through the penetration hole and the air intake passage, and the deposition (accumulation) of the deposits in the valve accommodating recess can be suppressed.

According to the present invention, since the deposition (accumulation) of the deposits in the valve accommodating recess can be suppressed, it is possible to prevent fixation or sticking of the valve body which is caused by the deposition of the deposits in the valve accommodating recess.

In addition, even in the case where the deposits are generated (accumulated) in the valve accommodating recess, by the suction force by the negative pressure of the internal combustion engine from the intake port, the deposits in the valve accommodating recess is sucked into the intake port through the communication passage, then the deposits can be removed from the valve accommodating recess. It is therefore possible to suppress the deposition (accumulation) of the deposits in the valve accommodating recess, and an occurrence of the problem of the fixation or sticking of the valve body caused by the deposition of the deposits can be prevented.

The other objects and features of this invention will become understood from the following description with reference to the accompanying drawings.

DETAILED DESCRIPTION OF THE INVENTION

Embodiments and modified examples of the present invention will be explained below with reference to the drawings. In the following description, the embodiments and the modified examples in which an air intake system of the present invention is applied to a tumble control valve for an in-line four-cylinder internal combustion engine will be explained.

Figure 1:
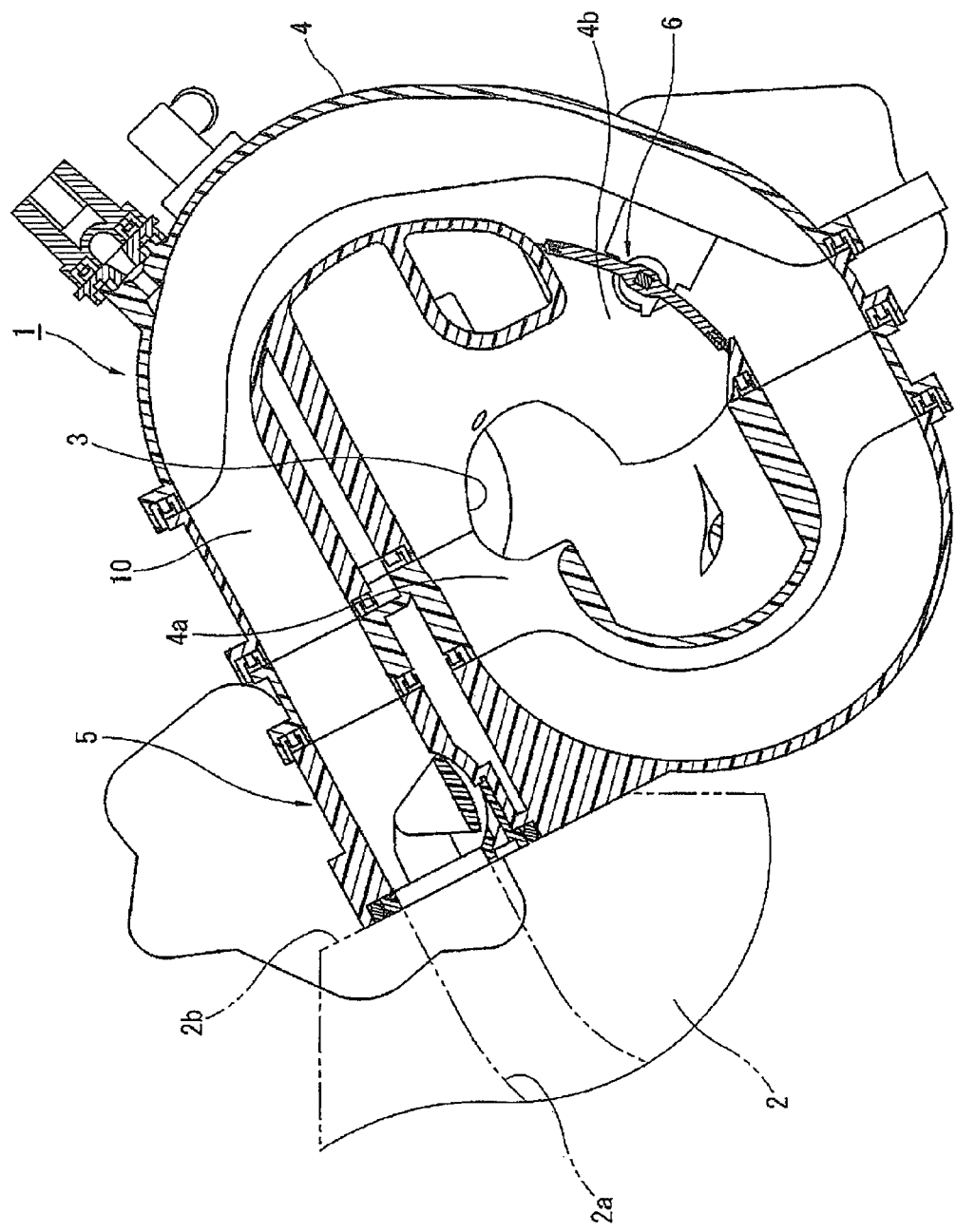
FIG. 1 is a sectional view of an air intake system for an internal combustion engine of the present invention with the air intake system mounted to the internal combustion engine.

FIG. 1 is a sectional view of the air intake system for the internal combustion engine of the present invention with the air intake system mounted to the internal combustion engine. In FIG. 1, for convenience sake, a cylinder head is shown by an imaginary line.

This air intake system 1 is a so-called intake manifold. The air intake system 1 is formed mainly from a collector section 3 that extends straight along a direction of a line of cylinders and serves to introduce air through a throttle valve (not shown), an intake pipe section 4 that has a round shape (or a circular shape) extending from the collector section 3 so as to surround the collector section 3 and forms in the inside thereof an air intake passage 10 for each cylinder by being isolated for each cylinder, and a tumble control valve 5 that has a valve body for each cylinder and is provided as a single-piece component at a top end of the intake pipe section 4 and also produces tumble flow in a combustion chamber (not shown) of the internal combustion engine.

The air intake system 1 is fixed to a mount surface 2b that is an opening end surface of an intake port 2a of a cylinder head 2 of the internal combustion engine through each bolt insertion hole 21a (described later) formed at an outer periphery of the tumble control valve 5 with a plurality of bolts (not shown).

Each base end portion (each downstream side end portion) of the intake pipe section 4 communicates with the collector section 3 through a first opening 4a that is formed on one side wall of the collector section 3. Further, each midpoint of the intake pipe section 4 communicates with the collector section 3 through a second opening 4b that is formed on the other side wall of the collector section 3. As shown in FIG. 1, each second opening 4b is provided with an intake control valve 6 that opens/closes the second opening 4b.

With this configuration, in a state in which the intake control valve 6 closes, a length of an air intake passage from the collector section 3 up to the intake port 2a becomes equal to a full length of the intake pipe section 4, then the intake pipe section 4 forms a relatively long air intake passage length. In a state in which the intake control valve 6 opens, the length of the air intake passage from the collector section 3 up to the intake port 2a becomes a relatively short air intake passage length. The intake pipe section 4 is thus configured to be able to change the air intake passage length between the two lengths according to an engine operating condition.

[First Embodiment]

Figure 2:
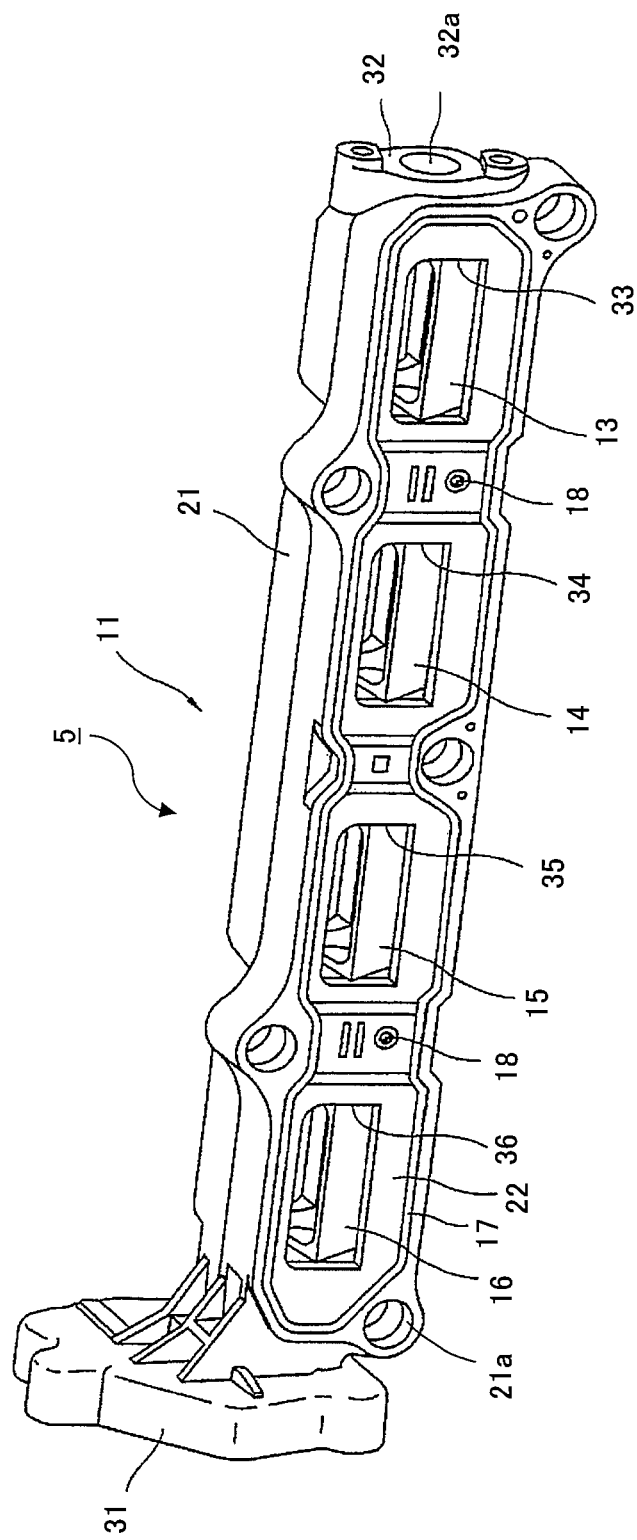
FIG. 2 is a perspective view of an intake control valve (a tumble control valve) according to a first embodiment of the present invention.
Figure 3:
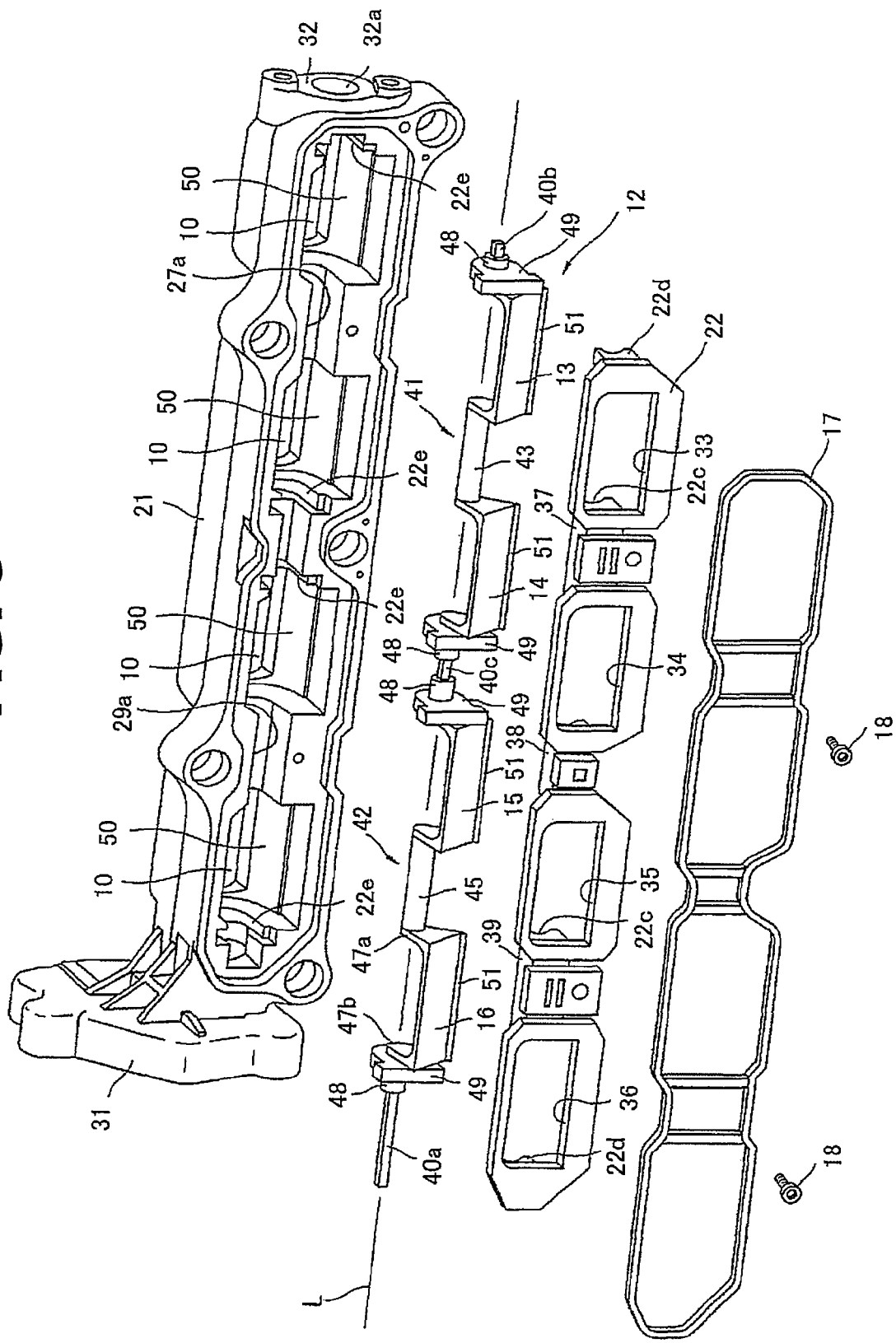
FIG. 3 is a perspective exploded view of the intake control valve (the tumble control valve) of the first embodiment.

FIG. 2 is a perspective view of an intake control valve (the tumble control valve) 5 according to a first embodiment of the present invention. FIG. 3 is a perspective exploded view of the intake control valve (the tumble control valve) of the first embodiment.

This tumble control valve 5 is formed mainly from a control valve housing (a housing) 11 that is fixed to a side surface (the mount surface 2b) of an intake side of the cylinder head 2 and a valve assembly 12 that has a series of four valve bodies 13 to 16.

The control valve housing 11 has a long narrow box-shaped housing body 21 that is formed, as an integral component, by hard synthetic resin material (rigid synthetic resin material) as a part of the intake manifold (a branch section is not shown), and a housing cover (a cover member) 22 that is formed by hard synthetic resin material (rigid synthetic resin material) and is fixed to the housing body 21 so as to cover a front surface of the housing body 21 with the valve assembly 12 accommodated in a front side opening of the housing body 21. The housing cover 22 is fixed to the housing body 21 with screws (or bolts) 18.

A reference number 17 in FIGS. 2 and 3 is a gasket that covers an opening edge of the front side opening of the housing body 21 and an outer peripheral edge of a front surface of the housing cover 22. The gasket 17 serves to ensure a sealing performance between the control valve housing 11 and the cylinder head 2 when the control valve housing 11 is fixed to the cylinder head 2.

The housing cover 22 has rectangular window openings (window portions) 33 to 36, each of which corresponds to an intake port upstream end of the cylinder. In an assembly state of the control valve housing 11 formed by combining the housing cover 22 with the housing body 21, four air intake passages 10, each of which is connected from the branch section to the intake port 2a (each of which communicates with the branch section and with the intake port 2a), are arranged parallel to each other in a lateral direction.

The valve assembly 12 is rotatably supported in this control valve housing 11, and the valve bodies 13 to 16 of the valve assembly 12 simultaneously open/close cross sections of parts of the four air intake passages 10.

The housing body 21 has, at one end in a longitudinal direction thereof, an actuator fixing flange 31 to which a rotation type actuator (not shown) is fixed, and also has, at the other end in the longitudinal direction thereof, a sensor fixing flange 32 to which an opening sensor (not shown) is fixed.

In an assembly state of the tumble control valve 5, a rotation axis (a rotation center line) L of the valve assembly 12 passes through an opening (a shaft insertion hole) 32a that is positioned in the middle of the sensor fixing flange 32, and extends in the longitudinal direction of the housing body 21 across a substantially center of each air intake passage 10.

The valve assembly 12 is formed by connecting a pair of valve body units 41 and 42 in series. Each of the valve body units 41 and 42 has a pair of valve bodies, namely that the valve body unit 41 has the pair of valve bodies 13 and 14 which are arranged in series, and the valve body unit 42 has the pair of valve bodies 15 and 16 which are arranged in series. Each of the valve body units 41 and 42 is formed by hard synthetic resin material (rigid synthetic resin material) by molding.

As can be seen in FIG. 3, the valve body units 41 and 42 have the pair of rectangular plate-shaped valve bodies 13, 14 and 15, 16 respectively, rectangular plate-shaped connecting wall portions (end wall portions) 47a and 47b positioned at both sides of the valve bodies 13, 14 and 15, 16, intermediate shaft portions (a first connecting portion 43 and a third connecting portion 45 respectively), each of which has a circular cross section and is positioned between the pair of valve bodies and connected between the inner side connecting wall portions 47a of the valve bodies 13, 14 and 15, 16, and relatively short cylindrical end shaft portions (boss portions, supporting shafts) 48, each of which is connected to the outer side connecting wall portion 47b of the valve bodies 13, 14 and 15, 16.

The intermediate shaft portions 43 and 45 and the end shaft portions 48 become a rotation axis of the valve body units 41 and 42 and the valve assembly 12.

Here, the intermediate shaft portions 43 and 45 and the end shaft portions 48 are set so that their axes (their shaft centers) are aligned with each other on the same straight line. More specifically, rotation axes (rotation center lines) of the intermediate shaft portions 43 and 45 and the end shaft portions 48 coincide with each other, and also coincide with the rotation axis (the rotation center line) L of the valve assembly 12.

The valve body units 41 and 42 are configured so that the valve bodies 13, 14 and 15, 16 are offset with respect to the rotation axis L of the valve assembly 12 and the connecting wall portions 47a and 47b are orthogonal to the rotation axis L of the valve assembly 12.

In FIGS. 2 and 3 showing the first embodiment, although a shape, in cross section that is orthogonal to the rotation axis L, of each of the valve bodies 13, 14 and 15, 16 which open/close the air intake passages 10 is a flat, the cross section shape could be a curved shape that curves along an arc formed with the rotation axis L being a center. Further, the intermediate shaft portions 43 and 45 and the end shaft portions 48 are formed so as to have the same diameter. However, the intermediate shaft portions 43 and 45 and the end shaft portions 48 might be formed so as to have different diameters.

As shown in FIG. 3, metal shafts (rotation shafts) 40b, 40c and 40a each having a rectangular cross section are press-fitted into the end shaft portions 48 of the valve body units 41 and 42. That is, the pair of valve body units 41 and 42 have the same configuration described above, and these two valve body units 41 and 42 are connected to each other by the intermediate connecting shaft (an intermediate shaft member, a second connecting portion 44) 40c.

One end of the intermediate connecting shaft 40c is press-fitted into the end shaft portion 48 that is one end of the valve body unit 41, while the other end of the intermediate connecting shaft 40c is press-fitted into the end shaft portion 48 that is one end of the valve body unit 42.

Further, the short sensor connecting shaft (a second shaft member) 40b is press-fitted into the end shaft portion 48 that is the other end of the valve body unit 41, while the relatively long actuator connecting shaft (a first shaft member) 40a is press-fitted into the end shaft portion 48 that is the other end of the valve body unit 42.

By rectilinearly assembling the pair of valve body units 41 and 42 and the shafts 40b, 40c and 40a in this manner, the valve assembly 12 in which the four valve bodies 13, 14 and 15, 16 are arranged in series is formed.

The valve assembly 12 having the four valve bodies 13, 14 and 15, 16 is rotatably supported in the control valve housing 11 through four bearings (four bearing holders) 49. Moreover, the intermediate shaft portions 43 and 45 are sandwiched between bearing portions (a first shaft supporting portion 27a and a third shaft supporting portion 29a) formed in the housing body 21 and bearing portions (shaft support portions) 22c formed at the housing cover 22, then the intermediate shaft portions 43 and 45 are rotatably supported.

The bearing 49 is formed, as an integral component, by hard synthetic resin material (rigid synthetic resin material). The bearing 49 is fitted to the end shaft portions 48 positioned at both sides of the valve body units 41 and 42 from an axial direction (the end shaft portion 48 is inserted into the bearing 49).

When setting the valve assembly 12 in the housing body 21, each bearing 49 is fitted in a stepped portion 22e that is provided at both sides of the air intake passage 10 in the housing body 21. Then, by attaching the housing cover 22 to the housing body 21, the bearing 49 (the valve assembly 12) is prevented from coming out (or falling out). Further, protruding pieces 22d that are formed in close proximity to the openings 33 to 36 of the housing cover 22 are inserted into respective positions that are contiguous to the stepped portion 22e, thereby limiting a position in the axial direction of each bearing 49.

The sensor connecting shaft 40b and the actuator connecting shaft 40a, positioned at the both ends of the valve assembly 12, are press-fitted into the respective end shaft portions 48 after accommodating the valve assembly 12 in the housing body 21. However, if the assembly of the valve assembly 12 (or assembly of the valve assembly 12 and the housing body 21) is possible, the sensor connecting shaft 40b and the actuator connecting shaft 40 can be previously press-fitted into the respective end shaft portions 48 of the valve body units 41 and 42. The opening sensor and the actuator (both not shown) are finally connected to these sensor connecting shaft 40b and actuator connecting shaft 40a.

When the valve bodies 13 to 16 rotate and are positioned in a rotation position in which the valve bodies 13 to 16 face to the housing cover 22 as shown in FIG. 2, the tumble control valve 5 closes a part of a cross section area of each air intake passage 10. When the valve bodies 13 to 16 rotate downward from the position of FIG. 2, the tumble control valve 5 fully opens each air intake passage 10.

Figure 4:
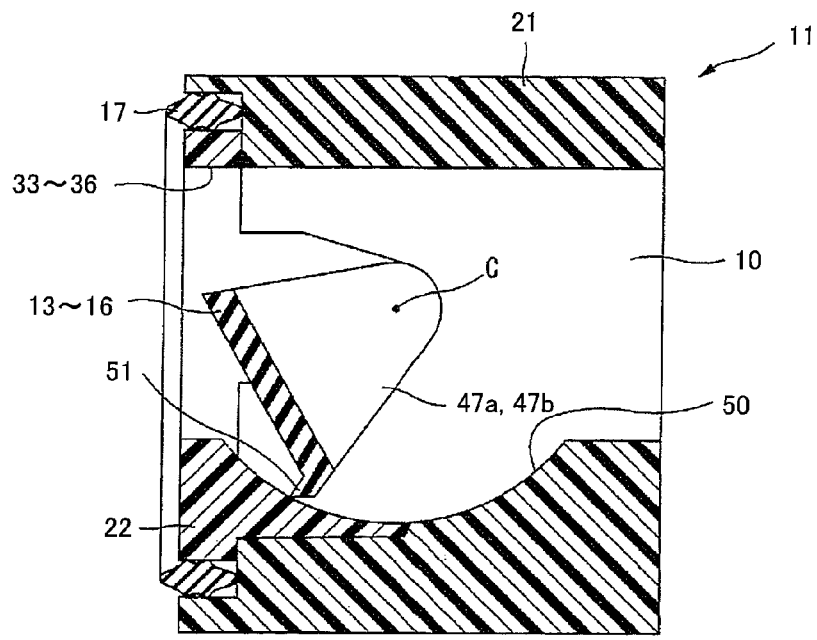
FIG. 4 is a sectional view of a main part of the intake control valve of the first embodiment.

As shown in FIG. 4, in the control valve housing 11, a valve accommodating recess (a valve accommodating space, a valve accommodating portion) 50 in which the respective valve bodies 13 to 16 can be accommodated is formed on an inner wall surface in each air intake passage 10 by the housing body 21 and the housing cover 22. This valve accommodating recess 50 is formed so that its bottom surface has a curved shape of an arc formed with the rotation axis L (a rotation center C in FIG. 4) being a center when viewed from the rotation shaft (the rotation axis) direction of the valve body units 41 and 42.

In FIG. 4, intake air flows in the air intake passage 10 in a direction from right hand side to left hand side in FIG. 4. Further, in FIG. 4, a rotation in a clockwise direction of the valve bodies 13 to 16 is a rotation of a valve closing direction, whereas a rotation in a counterclockwise direction of the valve bodies 13 to 16 is a rotation of a valve opening direction.

Here, a depth of the valve accommodating recess 50 in the present embodiment is set so that the valve accommodating recess 50 can accommodate the whole valve body (13 to 16) when the tumble control valve 5 fully opens the air intake passage 10. Further, the rotation center C in FIG. 4 coincides with the rotation axis L when viewed from the rotation shaft (the rotation axis) direction of the valve body units 41 and 42.

Each of the valve bodies 13 to 16 of the valve body units 41 and 42 is provided, on an outer peripheral side surface thereof which faces the bottom surface of the valve accommodating recess 50, with a protruding line 51 that extends along the rotation shaft (the rotation axis) direction of the valve body units 41 and 42.

This protruding line 51 is formed by the same hard synthetic resin material (the same rigid synthetic resin material) as that of the valve bodies 13 to 16, and has a substantially wedged shape in cross section. In the present embodiment, the protruding line 51 is provided at one end side along a rotation direction of the valve bodies 13 to 16. More specifically, the protruding line 51 is formed at an end portion on a valve opening direction side of the valve bodies 13 to 16 (i.e. an end portion on a lower side of the valve bodies 13 to 16 in FIG. 4) when viewed from the rotation shaft (the rotation axis) direction of the valve body units 41 and 42.

Furthermore, the protruding line 51 is set so that a rotation locus of a top end of the protruding line 51 is positioned in an outermost position of each rotation locus of the valve bodies 13 to 16 when viewed from the rotation shaft (the rotation axis) direction of the valve body units 41 and 42. The protruding line 51 is formed integrally with the respective valve bodies 13 to 16 when molding the valve body units 41 and 42.

With the configuration described above, even if deposits that are generated due to spitting from the combustion chamber (not shown) at a downstream side of the air intake passage 10 or EGR (Exhaust Gas Recirculation) deposit or accumulate in the valve accommodating recess 50, it is possible to expel (sweep away) the deposits from the valve accommodating recess 50 by the protruding line 51. Thus, since the deposition (accumulation) of the deposits in the valve accommodating recess 50 can be suppressed, it is possible to prevent fixation or sticking of the valve bodies 13 to 16 which is caused by the deposition of the deposits in the valve accommodating recess 50.

The deposits accumulated in the valve accommodating recess 50 are expelled (swept away) from the valve accommodating recess 50, for instance, by controlling drive of the actuator so that the valve bodies 13 to 16 rotate from a fully open position to a fully closed position at an engine start or an engine stop.

Further, since the protruding line 51 is formed at the end portion on the valve opening direction side of the valve bodies 13 to 16 (i.e. the end portion on the lower side of the valve bodies 13 to 16 in FIG. 4), a rotation angle range of the valve bodies 13 to 16 in which the protruding line 51 moves (or swings) throughout the bottom surface of the valve accommodating recess 50 can be set to be relatively small while the valve body (13 to 16) opens/closes a part of the cross section of the air intake passage 10.

In addition, the protruding line 51 is set so that the rotation locus of the top end of the protruding line 51 is positioned in the outermost position of each rotation locus of the valve bodies 13 to 16 when viewed from the rotation shaft (the rotation axis) direction of the valve body units 41 and 42. Therefore, as compared with a case where the valve bodies 13 to 16 are set so as not to interfere with the valve accommodating recess 50 without forming the protruding line 51, setting or adjustment of clearance between the valve bodies 13 to 16 and the valve accommodating recess 50 can be readily made. That is, as compared with a case where a clearance setting is made so that the whole of the outer peripheral side surface of each of the valve bodies 13 to 16 does not interfere with the bottom surface of the valve accommodating recess 50, the clearance setting between the valve bodies 13 to 16 and the valve accommodating recess 50 so that the protruding line 51 does not interfere with the valve accommodating recess 50 is easier, because an area undergone the clearance adjustment becomes relatively small.

Here, upon the expelling (the sweep away) of the deposits from the valve accommodating recess 50 by the protruding line 51, if the valve bodies 13 to 16 are rotated further from the fully open position in the counterclockwise direction in FIG. 4 until the protruding line 51 comes to an outside of the valve accommodating recess 50 which is an upstream side with respect to an upstream edge of the valve accommodating recess 50 and then are rotated up to around the fully closed position in the clockwise direction in FIG. 4, it is possible to effectively expel (sweep away) the deposits accumulated in the valve accommodating recess 50 from the valve accommodating recess 50.

Next, first to fourth modified examples of the present invention will be explained. In the following description, the same element or the same component as that of the first embodiment will be indicated by same reference number, and its explanation will be omitted here to avoid overlaps.

FIRST MODIFIED EXAMPLE

Figure 5:
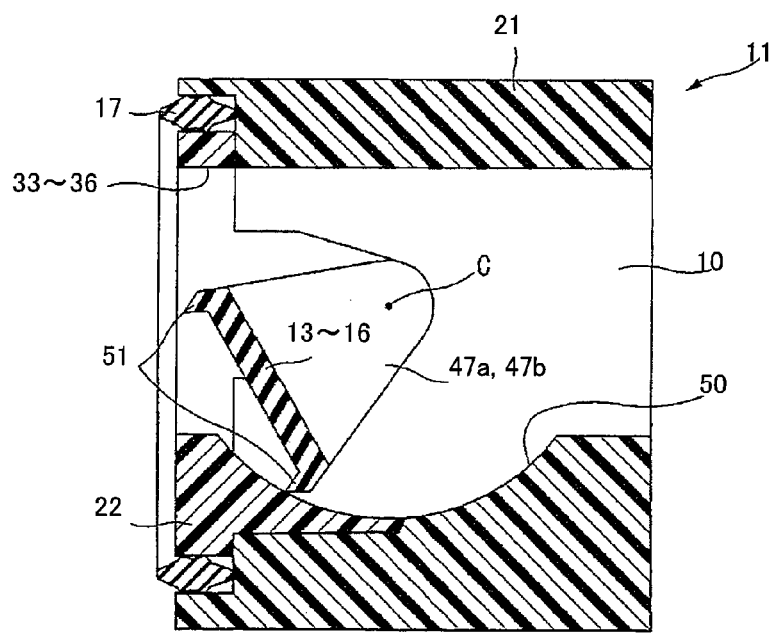
FIG. 5 is a sectional view of a main part of an intake control valve of a first modified example.

FIG. 5 shows a first modified example of the present invention. Although a configuration of the tumble control valve 5 of this first modified example is almost the same as that of the tumble control valve 5 of the first embodiment, the protruding line 51 is provided not only at one end side along the rotation direction of the valve bodies 13 to 16, but also at the other end side along the rotation direction of the valve bodies 13 to 16. Each protruding line 51 is formed by the same hard synthetic resin material (the same rigid synthetic resin material) as that of the valve bodies 13 to 16, and is formed integrally with the respective valve bodies 13 to 16.

As shown in this first modified example, the protruding lines 51 could be provided in a plurality of positions on the valve bodies 13 to 16.

SECOND MODIFIED EXAMPLE

Figure 6:
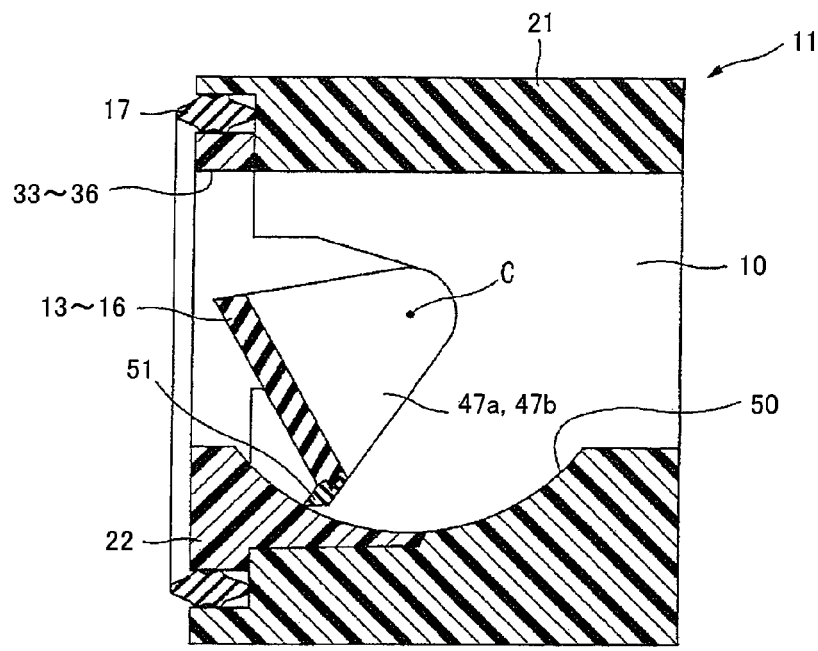
FIG. 6 is a sectional view of a main part of an intake control valve of a second modified example.

FIG. 6 shows a second modified example of the present invention. Although a configuration of the tumble control valve 5 of this second modified example is almost the same as that of the tumble control valve 5 of the first embodiment, the protruding line 51 is formed by different material from that of the valve bodies 13 to 16. That is, in this second modified example, the protruding line 51 is formed by rubber material or elastic material.

In the second modified example, a top edge of the protruding line 51 can touch the bottom surface of the valve accommodating recess 50, namely that the protruding line 51 moves along the arc-shaped bottom surface of the valve accommodating recess 50 with the top edge of the protruding line 51 coming into contact with the bottom surface of the valve accommodating recess 50. Thus, as compared with the first embodiment, an expelling performance of the deposits accumulated in the valve accommodating recess 50 can be further improved.

THIRD MODIFIED EXAMPLE

Figure 7:
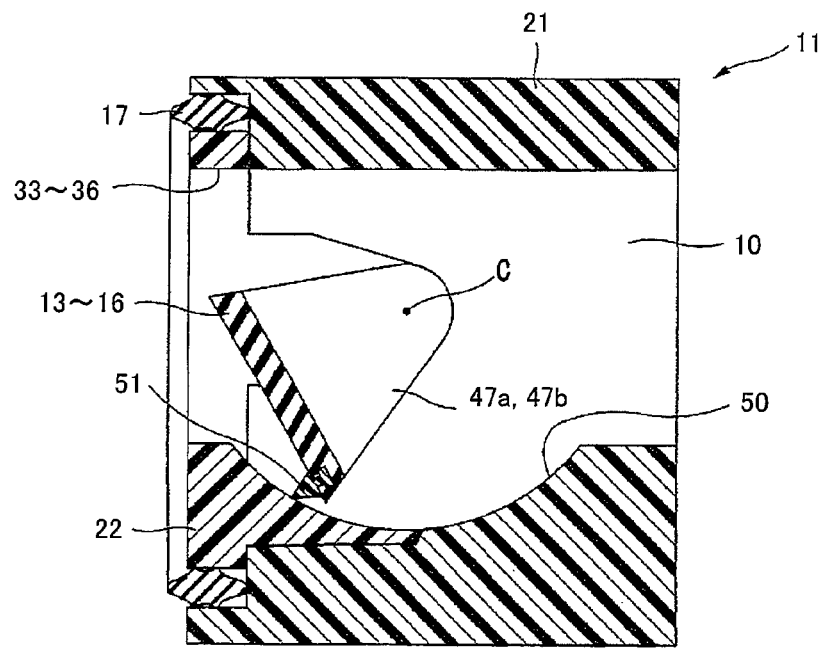
FIG. 7 is a sectional view of a main part of an intake control valve of a third modified example.

FIG. 7 shows a third modified example of the present invention. Although a configuration of the tumble control valve 5 of this third modified example is almost the same as that of the tumble control valve 5 of the first embodiment, the protruding line 51 is formed by different material from that of the valve bodies 13 to 16. That is, in this third modified example, the protruding line 51 is formed by material having a self-lubricating nature, such as fluorocarbon polymer material, which possesses low coefficient of friction and has high wear resistance.

In the third modified example, a top edge of the protruding line 51 and the bottom surface of the valve accommodating recess 50 are set so that a clearance between these top edge of the protruding line 51 and bottom surface of the valve accommodating recess 50 is zero (i.e. zero-clearance). Thus, as compared with the first embodiment, the expelling performance of the deposits accumulated in the valve accommodating recess 50 can be further improved.

FOURTH MODIFIED EXAMPLE

Figure 8:
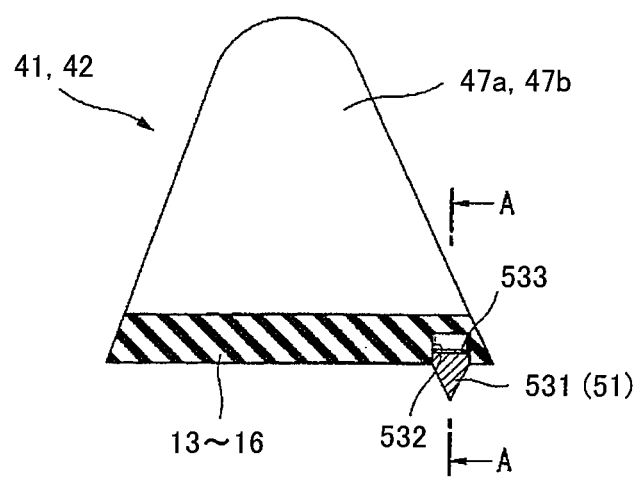
FIG. 8 is a sectional view of a valve body unit of a fourth modified example.
Figure 9:
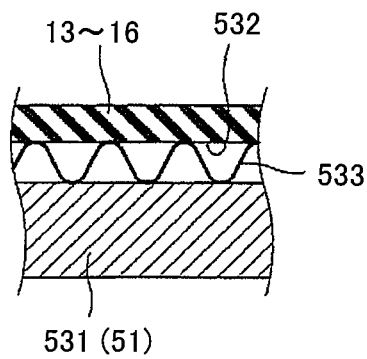
FIG. 9 is a sectional view taken along an A-A line of FIG. 8.

FIGS. 8 and 9 show a fourth modified example. FIG. 8 is a sectional view of the valve body units 41 and 42 of the fourth modified example. FIG. 9 is a sectional view taken along an A-A line of FIG. 8.

Although a configuration of the tumble control valve 5 of this fourth modified example is almost the same as that of the tumble control valve 5 of the first embodiment, the protruding line 51 of the valve bodies 13 to 16 is formed from a protruding line member 531 which is a separate member from the valve body units 41 and 42. More specifically, a hollow groove 532 having a rectangular cross section is formed at each of the valve bodies 13 to 16, and the protruding line member 531 formed by rubber material or elastic material and having a wedged shape in cross section is inserted into this hollow groove 532 through a corrugated plate spring (or a corrugated flat spring) 533. With this configuration, the protruding line 51 (the protruding line member 531) is forced toward or pressed against the bottom surface of the valve accommodating recess 50 by an urging force of the plate spring 533.

In the fourth modified example, a top edge of the protruding line 51 (the protruding line member 531) can be kept in absolute contact with the bottom surface of the valve accommodating recess 50 with stability. Thus, as compared with the first embodiment, the expelling performance of the deposits accumulated in the valve accommodating recess 50 can be further improved.

[Second Embodiment]

Figure 10:
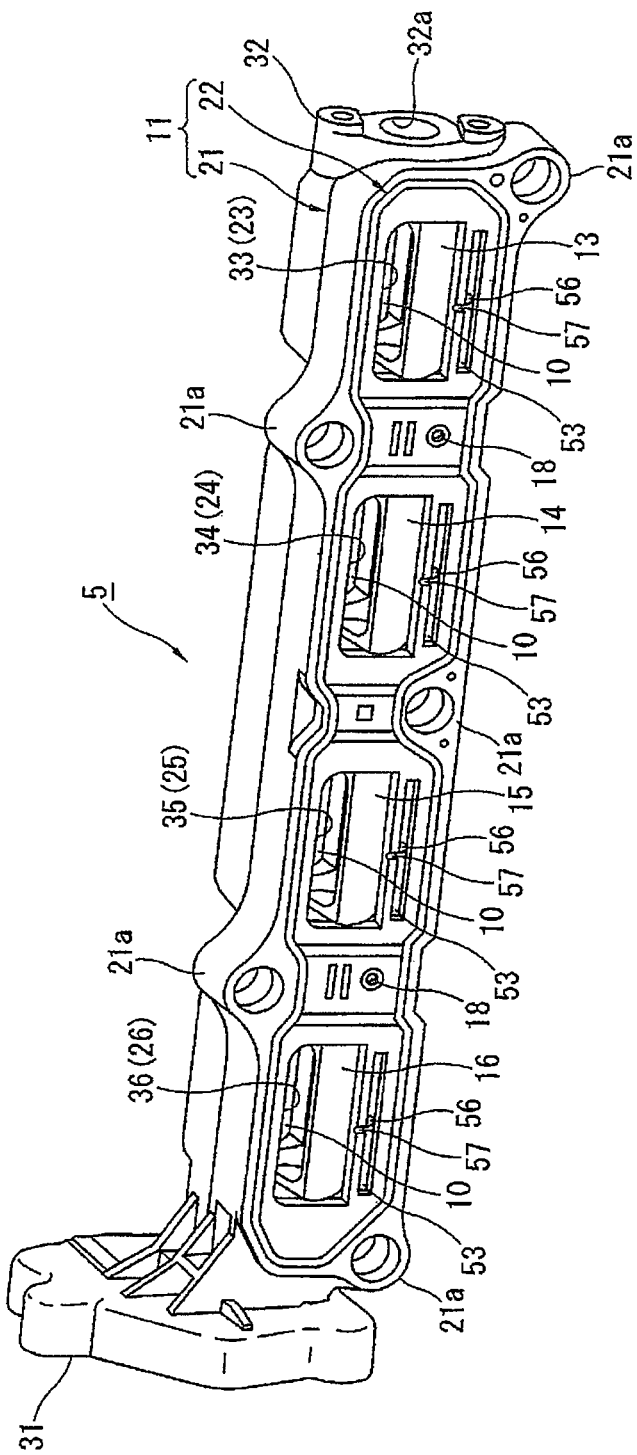
FIG. 10 is a perspective view of an intake control valve (a tumble control valve) according to a second embodiment of the present invention.
Figure 11:
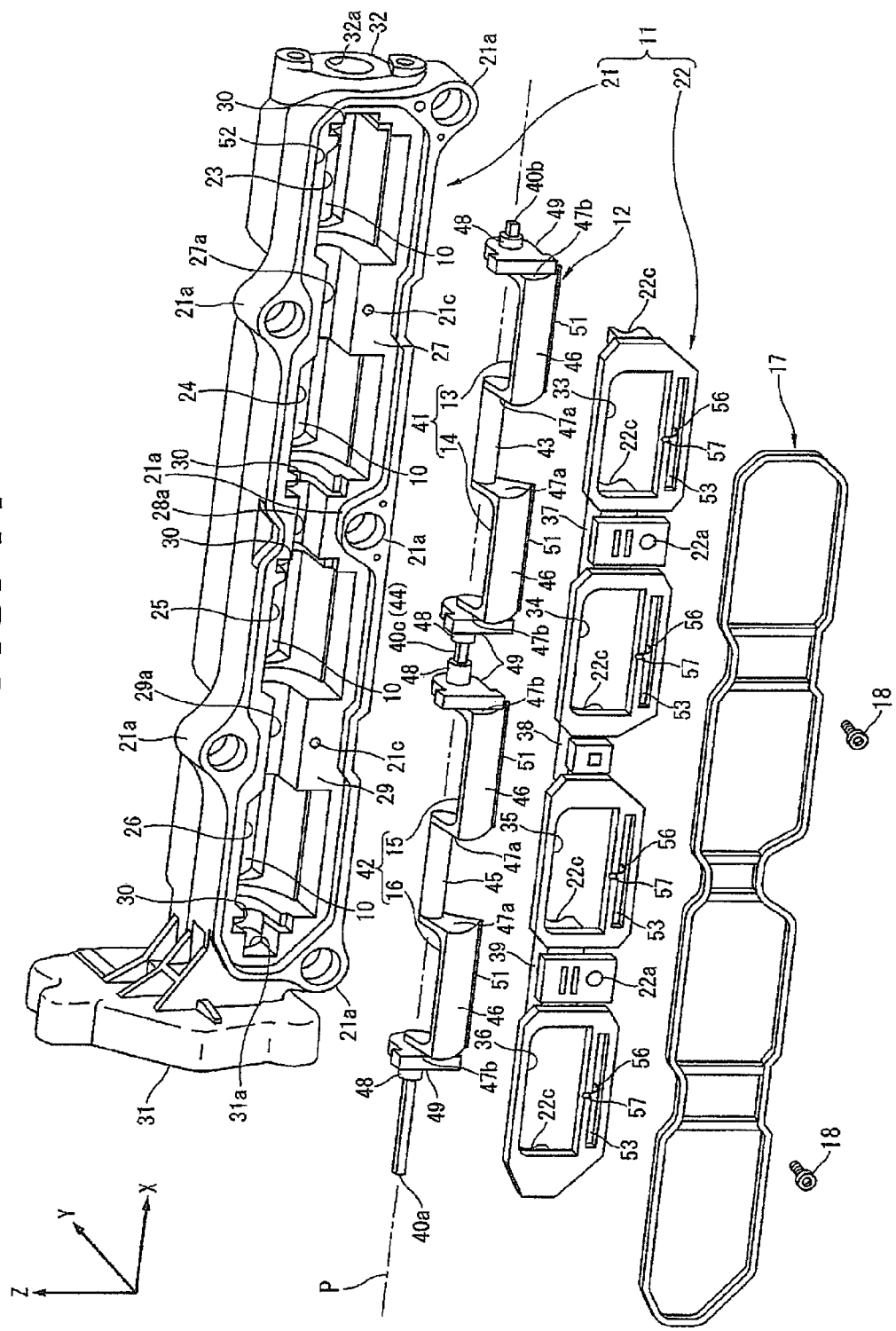
FIG. 11 is a perspective exploded view of the intake control valve (the tumble control valve) of the second embodiment.

FIG. 10 is a perspective view of the intake control valve (the tumble control valve) 5 according to a second embodiment of the present invention. FIG. 11 is a perspective exploded view of the intake control valve (the tumble control valve) 5 of the second embodiment. Both of FIGS. 10 and 11 are drawings when viewing the tumble control valve 5 from a front side of the tumble control valve 5.

The tumble control valve 5 is fixed to the mount surface 2b that is the opening end surface of the intake port 2a of the cylinder head 2 of the internal combustion engine (see FIG. 1). The tumble control valve 5 is formed mainly from the control valve housing (the housing) 11 that forms in the inside thereof an end portion of the air intake passage 10 of each cylinder and the valve assembly 12 that is rotatably supported in the control valve housing 11. The valve assembly 12 has the four valve bodies 13 to 16 that are arranged in series and change the cross section area of a part of each air intake passage 10.

The gasket 17 is provided between the front surface (a front end surface 21b) of the housing body 21 of the control valve housing 11 and the mount surface 2b of the cylinder head 2, and serves to ensure liquid-tightness of both surfaces 21b and 2b by being sandwiched between the surfaces 21b and 2b.

The control valve housing 11 has the housing body 21 that forms a part (the end portion) of the air intake passage 10 of each cylinder and accommodates therein the valve assembly 12, and the housing cover (the cover member) 22 provided so as to cover the front surface (a front end opening) of the housing body 21 with the valve assembly 12 accommodated in the housing body 21. The housing body 21 is directly fixed to the cylinder head 2. The housing cover 22 is directly secured to the housing body 21, and is held between the housing body 21 and the cylinder head 2.

The housing body 21 is formed by hard synthetic resin material (rigid synthetic resin material), and has an oblong shape that extends in a width direction (an X-axis direction in FIG. 11). The housing body 21 is provided, at an outer peripheral portion thereof, with a plurality of bolt insertion holes 21a into which bolts are inserted for fixing the housing body 21 to the cylinder head 2.

As shown in FIGS. 10 and 11, four passage forming portions (four passage openings) 23 to 26, each of which has rectangular shape in longitudinal cross section and forms the air intake passage 10 of the cylinder which is opened/closed by the valve assembly 12, are formed inside the housing body 21 so as to penetrate the housing body 21 in a depth direction (a Y-axis direction in FIG. 11). The four passage forming portions 23 to 26 are arranged parallel to each other at a predetermined intervals in the width direction.

Further, first to third separation wall portions 27 to 29 that define each of the passage forming portions 23 to 26 are formed between the passage forming portions 23 to 26 (between the passage forming portions 23 and 24, between the passage forming portions 24 and 25, and between the passage forming portions 25 and 26). Then, the first shaft supporting portion 27a, a second shaft supporting portion 28a and the third shaft supporting portion 29a, which support the first connecting portion 43, the second connecting portion 44 and the third connecting portion 45 of the valve assembly 12 respectively, are formed at front end portions of the first to third separation wall portions 27 to 29.

The connecting portions 43 to 45 are supported in cooperation with the shaft supporting portions 27a to 29a and the bearing portions (the shaft support portions) 22c that protrude from an inner side surface of the housing cover 22 and are fitted or inserted to the shaft supporting portions 27a to 29a in the assembly state of the control valve housing 11, i.e. in a state in which the housing cover 22 is secured to the housing body 21.

In addition, holder accommodating portions 30 that accommodate therein and retain the bearings (the bearing holders) 49 are formed at outer side portions of the passage forming portions 23 and 26 which are contiguous to the end wall portions 47b positioned at outer sides of the valve body units 41 and 42 and also formed at both side portions of the second separation wall portion 28 in the housing body 21. More specifically, the holder accommodating portions 30 are formed so as to open at the front surface side of the housing body 21 by cutting process, to accommodate the bearing holders 49 for supporting the valve assembly 12. That is, front end openings of the holder accommodating portions 30 are closed by the housing cover 22 with the bearing holders 49 fitted in the holder accommodating portions 30, thereby fixing the bearing holders 49 to the control valve housing 11 and smoothly rotatably supporting the valve assembly 12 in the control valve housing 11 through the bearing holders 49.

The housing body 21 is provided, at one end in the longitudinal direction thereof, with the actuator fixing flange 31 to which the actuator (not shown) that is a driving source of the valve assembly 12 is fixed. The actuator fixing flange 31 has a shaft insertion hole 31a into which the first shaft member 40a extending from one end of the valve assembly 12 is inserted toward or from an outside of the housing body 21. On the other hand, the housing body 21 is provided, at the other end in the longitudinal direction thereof, with the sensor fixing flange 32 to which the opening sensor (not shown) that detects an opening of the tumble control valve 5 on the basis of a rotation angle of the valve assembly 12 is fixed. The sensor fixing flange 32 has the shaft insertion hole 32a into which the second shaft member 40b extending from the other end of the valve assembly 12 is inserted toward or from the outside of the housing body 21.

The housing cover (the cover member) 22 is formed by hard synthetic resin material (rigid synthetic resin material), and has a frame shape. The housing cover 22 has the rectangular window openings (the window portions) 33 to 36 that correspond to the passage forming portions 23 to 26.

As shown in FIG. 11, the window portions 33 to 36 are connected through first to third connecting portions 37 to 39. A bolt insertion hole 22a is formed at both of the first and third connecting portions 37 and 39. The screws (or the bolts) 18 inserted into these bolt insertion holes 22a are screwed into female threads 21c that are formed at the first and third separation wall portions 27 and 29 of the housing body 21, thereby securing the housing cover 22 to the housing body 21.

The valve assembly 12 is formed by connecting the pair of valve body units 41 and 42 in series, respectively having the pair of valve bodies 13 and 14 coupled in series and accommodated in the passage openings 23 and 24 and the pair of valve bodies 15 and 16 coupled in series and accommodated in the passage openings 25 and 26, so as to be able to rotate integrally with each other (so as to be able to rotate together) through the intermediate shaft member (the second connecting portion 44) 40c having the rectangular shape in longitudinal cross section.

Each of the valve body units 41 and 42 is formed by hard synthetic resin material (rigid synthetic resin material) by molding.

To increase rigidity of the first to third connecting portions 43 to 45, a metal member (not shown) is inserted in both of the first connecting portion 43 (that corresponds to a supporting shaft of the present invention) connecting the valve bodies 13 and 14 and the third connecting portion 45 (that corresponds to a supporting shaft of the present invention) connecting the valve bodies 15 and 16. The second connecting portion 44 connecting the valve body units 41 and 42 is formed from the intermediate connecting shaft 40c that is formed by metal material.

Each of the valve bodies 13 to 16 is shaped into a substantially square bracket in cross section. The valve bodies 13 to 16 are arranged so as to be offset in a radially outward direction with respect to a rotation axis (a rotation center line) P of the valve assembly 12 which is a line formed by extending axes of the first to third connecting portions 43 to 45. The valve bodies 13 to 16 are each formed mainly from a valve portion 46 that opens/closes the respective air intake passages 10 formed by the passage forming portions 23 to 26 and the pair of connecting wall portions (end wall portions) 47a and 47b that are positioned at both ends in the width direction of the valve portion 46 and extend from the both ends of the valve portion 46 in a direction almost perpendicular to the valve portion 46 and connect the valve portion 46 and the first to third connecting portions 43 to 45.

The end wall portions 47a positioned at each inner side of the valve body units 41 and 42 and facing to each other are formed integrally with each other or are fixedly connected to each other through the first and third connecting portions 43 and 45. On the other hand, the substantially cylindrical end shaft portions (the boss portions, that correspond to the supporting shafts of the present invention) 48 to which the shaft members 40a, 40b and 40c are inserted and fixed are provided at outer side surfaces of the end wall portions 47b positioned at each outer side of the valve body units 41 and 42.

The boss portion 48 is inserted into the bearing (the bearing holder) 49 fitted in the holder accommodating portion 30 of the housing body 21, then is supported by the bearing holder

49. With this bearing support, the valve body units 41 and 42, i.e. the valve assembly 12, is rotatably supported in the housing body 21.

By employing the bearing support using the boss portion 48 in this manner, not only the smooth rotation support of the valve assembly 12 can be achieved, but also, because the shaft member having the substantially rectangular cross section is used as the shaft members 40a, 40b and 40c, relative rotation between the members (such as the valve body unit 41 and the valve body unit 42, the valve assembly 12 and a drive shaft of the actuator) connected through the shaft members 40a, 40b and 40c can be limited.

The valve portion 46 is provided, at a rear end edge on an outside surface thereof, with the protruding line 51 that extends in a width direction of the valve portion 46 throughout the width of the valve portion 46. The protruding line 51 is formed integrally with the valve portion 46 or is fixedly connected to the valve portion 46. As previously described above or will be described later in FIGS. 13 and 14, the protruding line 51 makes sliding contact with an inner side surface (the bottom surface) of the valve accommodating recess (the valve accommodating portion) 50 when the valve assembly 12 rotates.

With this configuration, even if the deposits generated due to spitting from the combustion chamber (not shown) or EGR (Exhaust Gas Recirculation) deposit or accumulate in the valve accommodating recess 50, by rotating the valve assembly 12, the deposits are expelled (swept away) from the valve accommodating recess 50 to the air intake passage 10 side by the protruding line 51. It is therefore possible to prevent the deposition (accumulation) of the deposits in the valve accommodating recess 50 and the fixation or sticking of the valve bodies 13 to 16 caused by the deposition of the deposits.

Figure 12:
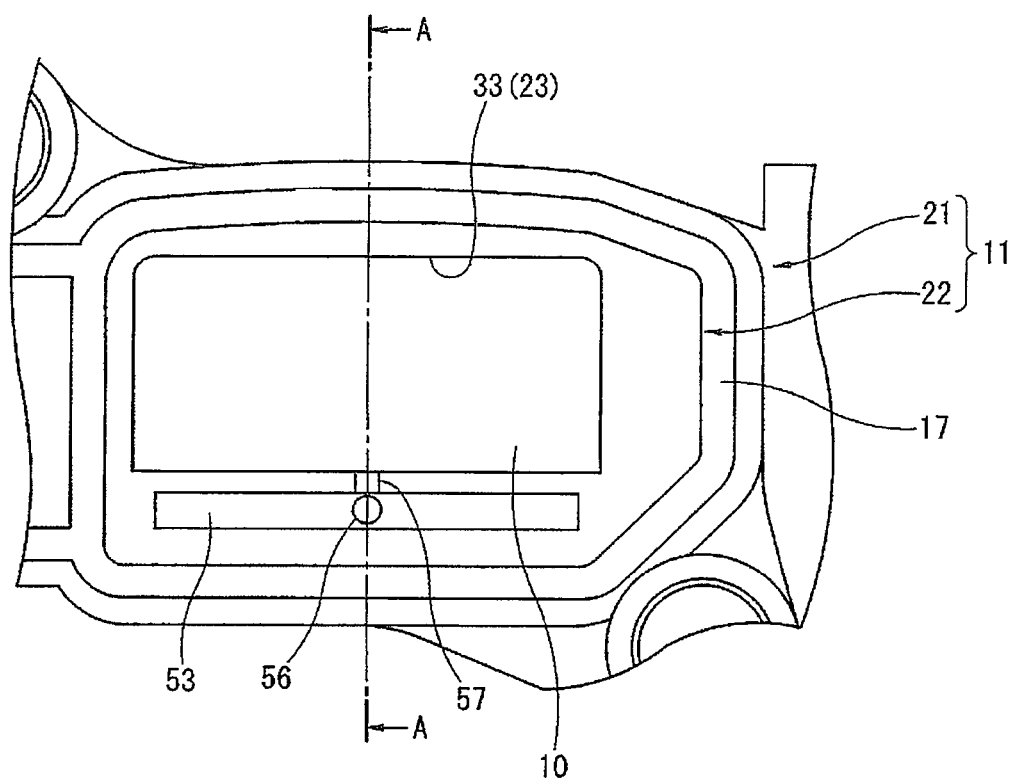
FIG. 12 is a front view of an opening (a window) of the intake control valve, which is opened/closed by a valve body of the intake control valve, of the second embodiment shown in FIG. 10.
Figure 13:
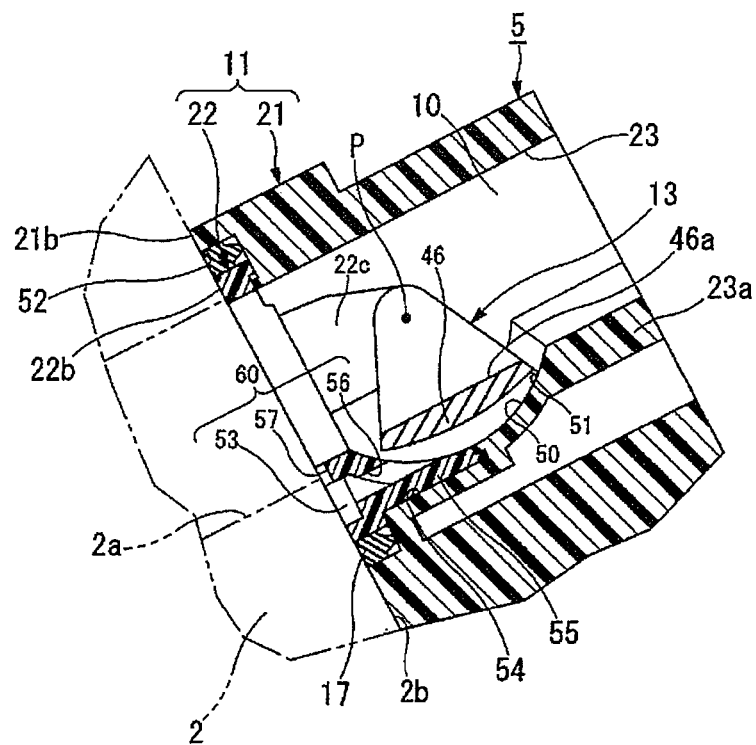
FIG. 13 is a sectional view of the intake control valve (a fully open state), taken along an A-A line of FIG. 12.
Figure 14:
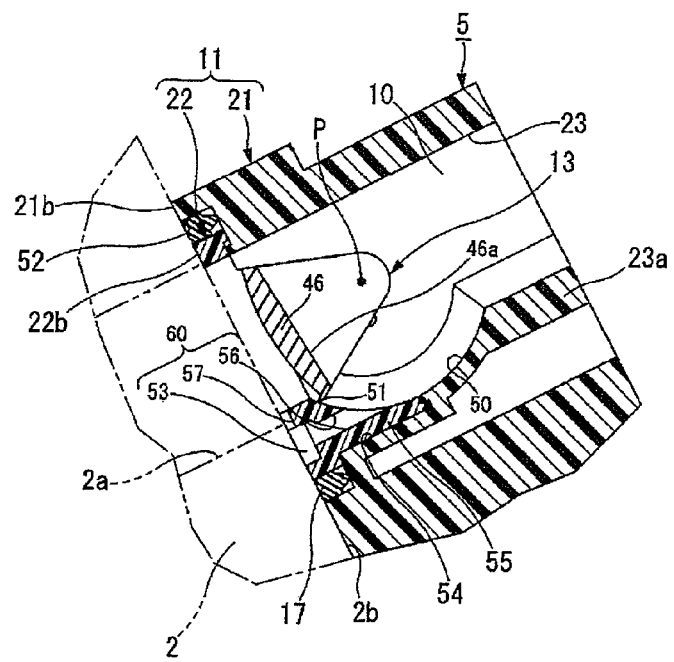
FIG. 14 is a sectional view of the intake control valve (a fully closed state).

FIG. 12 is a front view of the tumble control valve 5 with one of the valves enlarged, showing the window opening of the tumble control valve 5. FIG. 13 is a sectional view of the tumble control valve 5 (a fully open state), taken along an A-A line of FIG. 12. FIG. 14 is a sectional view of the tumble control valve 5 (a fully closed state), taken along the A-A line of FIG. 12.

In the following description, since valve configurations of the four valves (the four valve bodies 13 to 16) are the same, the valve of valve body 13 will be explained as an example.

The valve assembly 12 of the tumble control valve 5 is accommodated in the control valve housing 11 so that the rotation axis P of the valve assembly 12 passes through a substantially middle of the passage forming portion 23 in the control valve housing 11. Further, an offset amount of the valve portion 46 is set so that an inner side surface 46a of the valve portion 46 is flush with a bottom wall 23a of the passage forming portion 23 in the fully open state and also the inner side surface 46a of the valve portion 46 can rotate within almost 90 degrees from a state in which the inner side surface 46a and the bottom wall 23a are parallel to each other to a state in which the inner side surface 46a is perpendicular to the bottom wall 23a.

In addition, the valve accommodating recess 50 in which the valve portion 46 of the valve body 13 can be accommodated in the valve open state is formed on the bottom wall 23a of the passage forming portion 23. More specifically, the valve accommodating recess 50 is formed, in order to secure the rotation of the valve body 13 including the protruding line 51, so that its inner side surface (the bottom surface of the valve accommodating recess 50) has an arc shape in cross section along the rotation locus of the top end of the protruding line 51 when the valve body 13 rotates. Further, for convenience in assembly, the valve accommodating recess 50 is formed by the housing body 21 and the housing cover 22, namely that the valve accommodating recess 50 is formed by ranging or reaching from the housing body 21 to the housing cover 22 (or from the housing cover 22 to the housing body 21). That is, the valve accommodating recess 50 is formed so that a connecting (or a separating) part between the housing body 21 and the housing cover 22 becomes a lowermost part of the valve accommodating recess 50, and a rear half of the valve accommodating recess 50 is formed by the housing body 21, and a front half of the valve accommodating recess 50 is formed by the housing cover 22.

The housing cover 22 is fitted in a fitting recess 52 that is formed on the front end surface 21b of the housing body 21 so that an outer side surface of the housing cover 22 is substantially flush with the front end surface 21b of the housing body 21. Then, the housing cover 22 is supported and sandwiched between the housing body 21 and the mount surface 2b of the cylinder head 2 together with the gasket 17 covering an outer peripheral side (the outer peripheral edge) of the housing cover 22.

The window opening (the window portion) 33 is set to be slightly smaller (narrower) than an opening area of the intake port 2a, and set to be almost same as the passage cross section area of the air intake passage 10.

As shown in FIG. 12 (also FIGS. 11 and 13), on an outer side of the window portion 33, a rectangular recessed portion 53 whose width is nearly the same as that of the window portion 33 is formed at a lower side of the window portion 33. Further, on an inner side of the window portion 33, a support portion 55 that protrudes inwards and has a substantially brimmed shape, is formed at the lower side of the window portion 33. This support portion 55 is fitted to a fitting recessed portion 54 that is formed at an opening end of the passage forming portion 23, which becomes a part of a configuration of the valve accommodating recess 50.

The support portion 55 has, in a position which is a middle portion in a width direction of the support portion 55 and a middle portion in a height direction (a Z-axis direction in FIG. 11) of the support portion 55, a communication hole 56 (that corresponds to a penetration hole of the present invention) that penetrates the recessed portion 53 and directly connects the valve accommodating recess 50 and the outside.

This communication hole 56 has a substantially circular shape in cross section, and a diameter of the communication hole 56 is set to the substantially same size as a height of the recessed portion 53. Further, the communication hole 56 is set on a tangent (a tangential line) to the valve accommodating recess 50.

In addition, a communication groove 57 is formed at a front end surface 22b of the housing cover 22 by cutting. The communication groove 57 is a groove that directly connects the window portion 33 and the recessed portion 53 in the assembly state in which the control valve housing 11 is fixed to the cylinder head 2. The communication groove 57 has a substantially semicircular in cross section, and a width of the communication groove 57 is set to the substantially same size as the diameter of the communication hole 56.

As explained above, the tumble control valve 5 has a series of communication passage 60 formed by the communication hole 56, the recessed portion 53 and the communication groove 57. Thus, the valve accommodating recess 50 directly communicates with the intake port 2a through the communication passage 60 without through the window portion 33.

Figure 15:
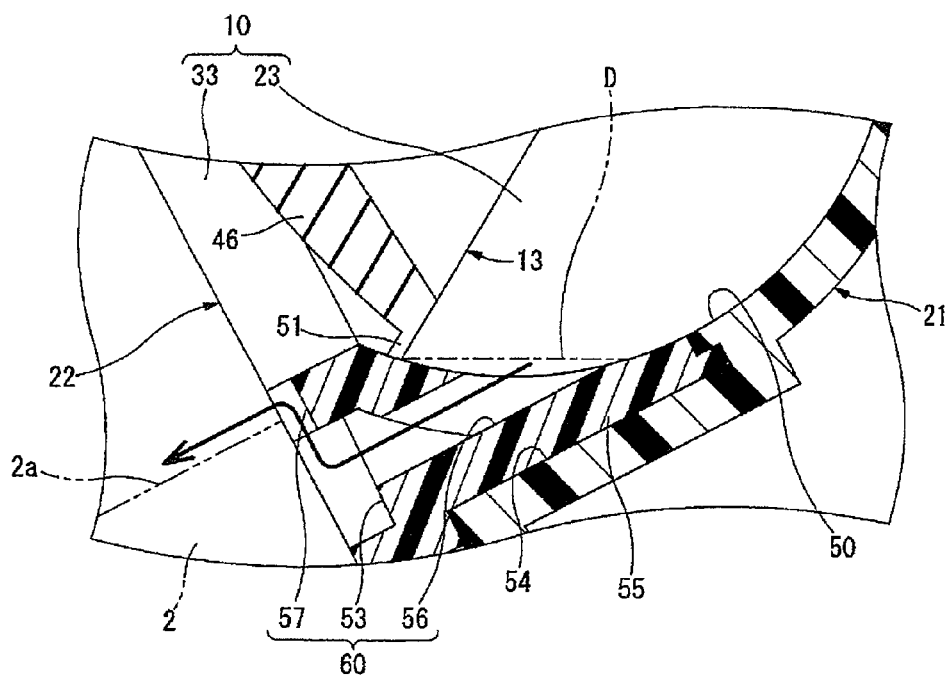
FIG. 15 is an enlarged view of a main part of the intake control valve shown in FIG. 14.

Next, working and effect of the tumble control valve 5 (the valve opened/closed by the valve body 13) of the present embodiment will be explained with reference to FIGS. 13 to 15. FIG. 15 is an enlarged view of a main part of the tumble control valve 5 shown in FIG. 14, showing the communication passage 60 which is one of structural features of the present invention. In FIG. 15, a dashed line indicates the deposits generated in the valve accommodating recess 50.

When an engine operating condition is in a low-rpm region, the tumble control valve 5 is controlled to be the fully closed state in which the passage cross section area of the air intake passage 10 is a minimum by driving the rotation of the valve assembly 12 so that the valve portion 46 is almost perpendicular to the air intake passage 10. With this control, the strong tumble flow is produced in the combustion chamber by this minimized opening area of the air intake passage 10. As a consequence, uniform mixture is ensured, and stable combustion can be achieved even when carrying out the heavy EGR (even when a large amount of EGR gas is introduced).

On the other hand, when an engine revolution speed increases and the engine operating condition is in a high-rpm region, the tumble control valve 5 is controlled to be the fully open state in which the passage cross section area of the air intake passage 10 is a maximum by driving the rotation of the valve assembly 12 so that the valve portion 46 is almost parallel to the air intake passage 10. With this control, maximum intake air can be supplied to the combustion chamber, and this brings an improvement in an engine output.

Here, since the valve accommodating recess 50 that accommodates therein the valve portion 46 at the valve opening is formed in the tumble control valve 5, if the deposits D generated due to spitting from the combustion chamber or EGR deposit or accumulate in the valve accommodating recess 50, the fixation or sticking of the valve body 13 might occur due to the deposition of the deposits.

For this problem, in the present embodiment, the series of communication passage 60 connecting the valve accommodating recess 50 and the intake port 2a is formed at the support portion 55 of the housing cover 22 that forms a front end side (the front half) of the valve accommodating recess 50. That is, as indicated by an arrow in FIG. 15, since the communication hole 56 communicating with the intake port 2a through the recessed portion 53 and the communication groove 57 is provided, even in the case where the deposits D are generated (accumulated) in the valve accommodating recess 50, by a suction force by a negative pressure from the intake port 2a which is transmitted through the series of communication passage 60, the deposits D generated in the valve accommodating recess 50 is sucked into the intake port 2a, then the deposits D can be removed from the valve accommodating recess 50. Consequently, it is possible to suppress the deposition (accumulation) of the deposits D in the valve accommodating recess 50, and an occurrence of the problem of the fixation or sticking of the valve body 13 caused by the deposition of the deposits D can be prevented.

Further, in the present embodiment, since the deposits D generated (accumulated) in the valve accommodating recess 50 can be swept away by the protruding line 51 provided at the valve portion 46, the deposits D that can not be removed even by the suction through the communication passage 60 are swept away to the air intake passage 10 side by the protruding line 51 when the valve assembly 12 rotates, and the deposits D are introduced to the intake port 2a together with the intake air. With this working, it is possible to surely suppress the deposition (accumulation) of the deposits D in the valve accommodating recess 50.

Furthermore, in the present embodiment, the series of communication passage 60 is formed as a so-called bypass passage that is different from the air intake passage 10. Thus, especially when the engine operating condition is in the low-rpm region at which a large amount of EGR gas is introduced, i.e. especially when the tumble control valve 5 is controlled to be the closed state (see FIG. 14), even though the communication between the intake port 2a and the air intake passage 10 is disrupted by the protruding line 51, the removal of the deposits D from the valve accommodating recess 50 can be done through the series of communication passage 60 formed as the bypass passage.

In addition, the communication hole 56 is set at a comparatively lower side (i.e. the bottom) of the valve accommodating recess 50. Therefore, the deposits D generated in the valve accommodating recess 50 can effectively be sucked, then the removal of the deposits D is achieved.

Moreover, in the present embodiment, the series of communication passage 60 directly communicates with the intake port 2a. Also by this configuration, the deposits D generated in the valve accommodating recess 50 can effectively be sucked and the removal of the deposits D is achieved.

Additionally, since the series of communication passage 60 is formed by the communication hole 56, a passage cross section area of the communication passage 60 can be reduced to a minimum. Thus, at the valve closing control which requires production of even stronger tumble flow, it is possible to keep a decrease in a generation efficiency of swirl flow or tumble flow to a minimum without forming a redundant or unnecessary opening. That is, a suction effect of the deposits D can be obtained while reducing an influence on the production of the tumble flow to a minimum.

FIFTH MODIFIED EXAMPLE

Figure 16:
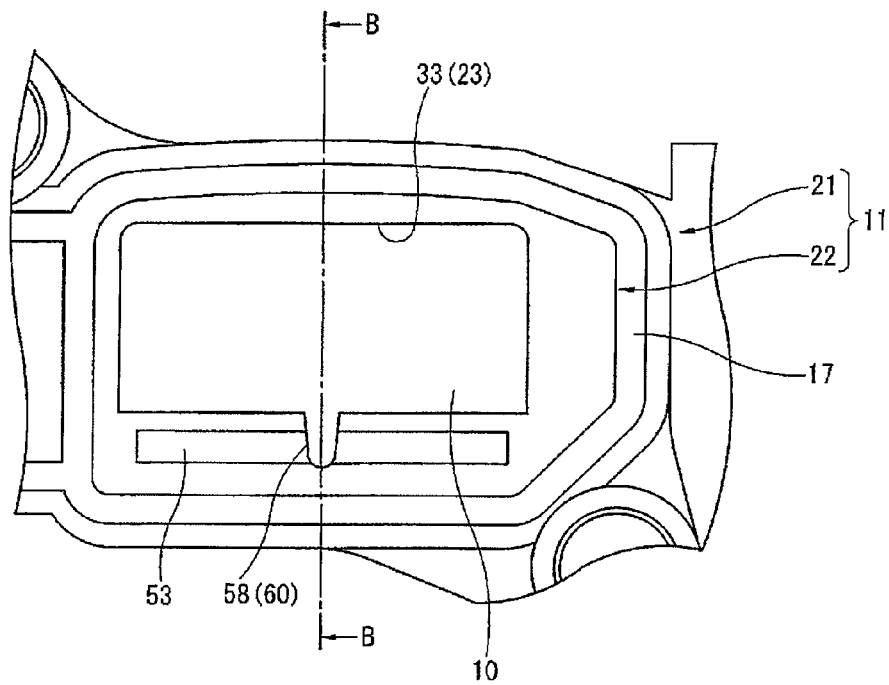
FIG. 16 is a front view of an opening (a window) of an intake control valve of a fifth modified example.
Figure 17:
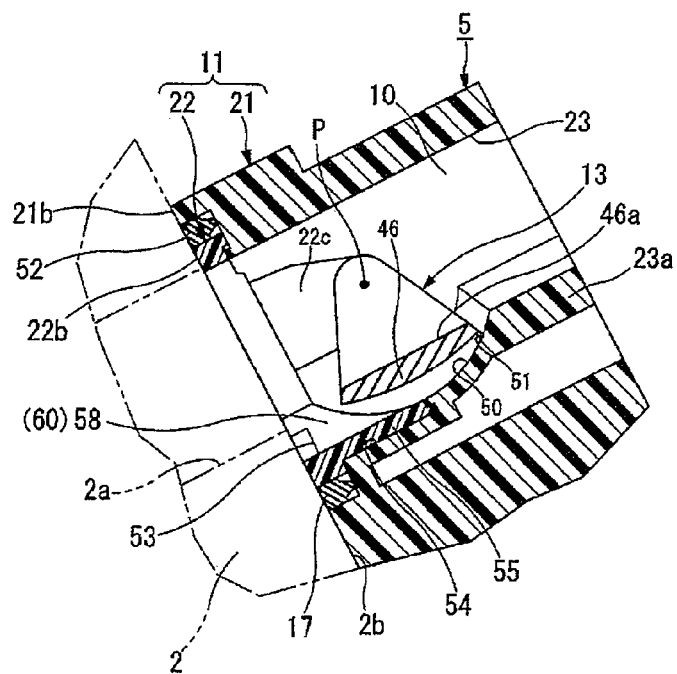
FIG. 17 is a sectional view of the intake control valve, taken along a B-B line of FIG. 16.

FIGS. 16 and 17 show a fifth modified example of the present invention, which change the configuration of the communication passage 60 of the second embodiment.

In the present modified example, since a basic structure of configuration of the tumble control valve 5 is the same as that of the second embodiment, the same element or the same component as that of the second embodiment will be indicated by same reference number, and its explanation will be omitted here. Further, since valve configurations of the valves are the same, the valve of valve body 13 will be explained as an example.

In the fifth modified example, the communication passage 60 is formed by a communication groove 58 (that corresponds to a cutting groove of the present invention) having an almost U-shaped cross section which is formed by cutting a middle portion of a lower end side opening edge of the window portion 33 of the housing cover 22 along a thickness direction (a depth direction) of the housing cover 22. With this structure, the front end side of the valve accommodating recess 50 directly communicates with the intake port 2a through this communication groove 58.

Thus, in the present modified example as well, the same working and effect as those of the second embodiment can be obtained by the communication passage 60 formed by the communication groove 58. Further, especially in the present modified example, since the communication passage 60 is formed by the rectilinear communication groove 58, the communication passage 60 can be easily formed (molded). As a consequence, good quality of the tumble control valve 5 (the air intake system 1) can be maintained, and productivity of the tumble control valve 5 (the air intake system 1) can be increased.

In addition, since the communication passage 60 is provided by the communication groove 58 which can be simply formed, a simplification of a mold of the housing cover 22 can be made, and this contributes to reduction of manufacturing cost of the tumble control valve 5 (the air intake system 1).

The present invention is not limited to the above embodiments and modified example described above. The configuration or structure of each component or element of the tumble control valve 5, for instance, the shaft supporting structure (the bearing structure) of the valve assembly 12 and an outside shape and the fixing structure of the control valve housing 11 which have no direct bearing on the configuration of the present invention, and also the series of communication passage 60 formed by the communication hole 56 etc. or the communication groove 58 which has direct bearing on the configuration of the present invention, can be changed or modified according to specifications of the internal combustion engine.

For instance, the second embodiment shows, as an example, the series of communication passage 60 that directly communicates with the intake port 2a. However, the structure of the communication passage 60 is not limited to this directly communicating structure. That is, in the case where the configuration of the communication passage 60 using the communication hole 56 is employed, the communication passage 60 could open at an upstream side with respect to the opening end of the intake port 2a, e.g. in a downstream side position with respect to the valve accommodating recess 50 in the air intake passage 10, then the communication passage 60 communicates with the intake port 2a through the downstream side in the air intake passage 10. With this configuration as well, the effect of the present invention, described in the second embodiment, can be obtained.

Further, the second embodiment shows, as an example, the configuration in which the communication groove 57 is formed at the front end surface 22b of the housing cover 22 to improve the communication between the valve accommodating recess 50 and the intake port 2a. However, when forming the series of communication passage 60, the communication groove 57 could be removed (the communication groove 57 is not a necessary portion or element). That is, since the housing cover (the cover member) 22 is assembled within manufacturing tolerances, a slight gap appears between the front end surface 22b of the housing cover 22 and the mount surface 2b of the cylinder head 2. Thus, the series of communication passage 60 can be formed by the slight gap between the surfaces 2b and 22b even without forming the communication groove 57. Even this configuration has the effect of the present invention, described in the second embodiment.

The present invention can be applied to not only the tumble control valve for the internal combustion engine, but also a swirl control valve for the internal combustion engine.

The entire contents of Japanese Patent Applications No. 2013-038069 filed on Feb. 28, 2013 and No. 2013-106693 filed on May 21, 2013 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An air intake system for an internal combustion engine comprising:
    a valve body that can open/close a passage cross section of a part of an air intake passage;
    a rotation shaft that extends to both sides of the valve body and supports rotation of the valve body, the valve body being configured to be offset with respect to a rotation axis of the rotation shaft;
    a valve accommodating recess that is formed on an inner wall surface of the air intake passage and accommodates therein the valve body; and
    a protruding line that is formed on an outer peripheral side surface of the valve body, which faces the valve accommodating recess, and extends along a shaft direction of the rotation shaft.

2. The air intake system for the internal combustion engine as claimed in claim 1, wherein:
    the protruding line is formed at one end side along a rotation direction of the valve body.

3. The air intake system for the internal combustion engine as claimed in claim 1, wherein:
    the protruding lines are formed at one end side and the other end side along a rotation direction of the valve body.

4. The air intake system for the internal combustion engine as claimed in claim 1, wherein:
    the protruding line is set so that, when viewed from the shaft direction of the rotation shaft, a rotation locus of a top end of the protruding line is positioned in an outermost position of a rotation locus of the valve body.

5. An air intake system for an internal combustion engine comprising:
    a housing that forms therein an air intake passage connecting to an intake port of the internal combustion engine;
    a valve body that is rotatably supported in the housing through a rotation shaft and has a valve portion provided so as to be offset in a radially outward direction with respect to a rotation axis of the rotation shaft, the valve body changing a passage cross section area of a part of the air intake passage by the valve portion;
    a valve accommodating recess that is formed on an inner wall surface at a vertically lower side in the air intake passage and accommodates therein the valve portion at valve opening; and
    a communication passage that is formed in the housing and directly connects the valve accommodating recess and the intake port.

6. The air intake system for the internal combustion engine as claimed in claim 5, wherein:
    a part of the communication passage is formed by a penetration hole which penetrates an inside of the housing and whose one end opens at an inner surface of the valve accommodating recess.

7. The air intake system for the internal combustion engine as claimed in claim 5, wherein:
    the communication passage is formed by a cutting groove which is formed along the air intake passage by recessing the inner wall surface of the air intake passage and whose one end opens at an inner surface of the valve accommodating recess and whose other end opens in the intake port.

8. An air intake system for an internal combustion engine comprising:
    a housing that forms therein an air intake passage connecting to an intake port of the internal combustion engine;

a valve body that is rotatably supported in the housing through a rotation shaft and has a valve portion provided so as to be offset in a radially outward direction with respect to a rotation axis of the rotation shaft, the valve body changing a passage cross section area of a part of the air intake passage by the valve portion;

a valve accommodating recess that is formed on an inner wall surface at a vertically lower side in the air intake passage and accommodates therein the valve portion at valve opening; and a communication passage that is formed in the housing and directly connects the valve accommodating recess and the intake port, and a part of the communication passage being formed by a penetration hole which penetrates an inside of the housing and whose one end opens at an inner surface of the valve accommodating recess.

\* \* \* \* \*